…

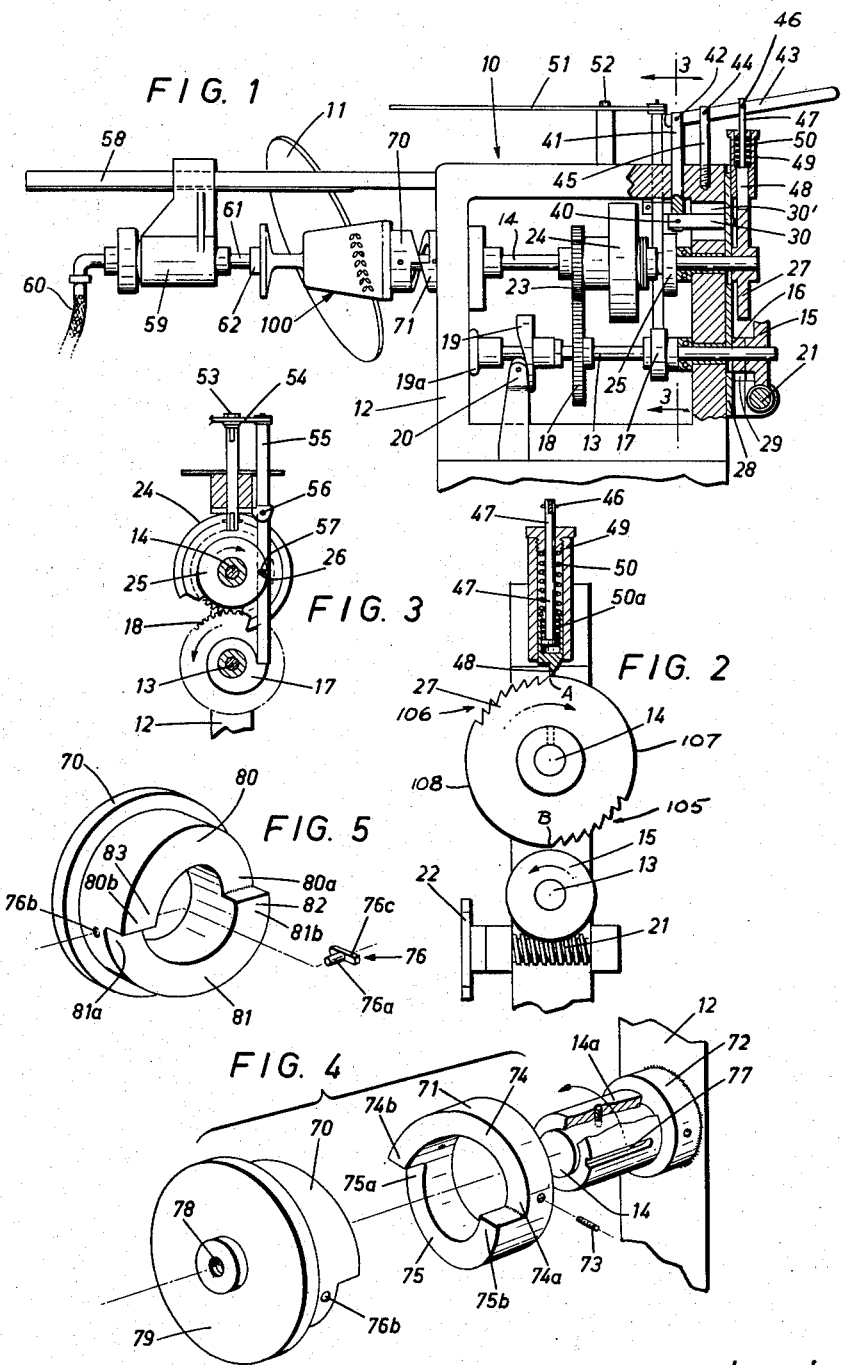

United States Patent Office 3,071,896
Patented Jan. 8, 1963

3,071,896
ARTICLE ROTATING AND ADVANCING MECHANISM FOR CUTTING OR GRINDING MACHINE
Phillip C. Kayser, R.R. 1, Markham, Ontario, Canada
Filed Apr. 14, 1961, Ser. No. 103,002
17 Claims. (Cl. 51—89)

This invention relates to a cutting or grinding machine. More particularly, this invention relates to an article rotating and advancing mechanism adapted for use with a cutting or grinding machine. Even more particularly, this invention relates to a glass rotating and advancing mechanism adapted for use with a glass grinding or cutting machine.

While my invention will be hereinafter described in detail in connection with the application of ornamentation to glasses or tumblers, it will be realized that apparatus embodying my invention is adaptable for the cutting or grinding of objects made of wood, metal, plastics, etc.

In United States Patent Number 2,795,087 dated June 11, 1957, entitled, "Cutting or Grinding Machines," and issued to Victor Walker, there is described a glass cutting or grinding machine. The mechanism which forms the subject of my invention is an improvement on the machine shown in the aforementioned patent and permits the cutting or grinding on a glass of particularly popular ornamentation which cannot be applied by the machine shown in the aforementioned patent, but can be applied when this machine is modified in accordnace with my invention.

It is, therefore, an object of my invention to provide, in combination with a glass grinding or cutting mechanism, a glass rotating and advancing mechanism which permits a particular type of ornamentation to be applied to a glass.

A further object of my invention is to provide a machine which is an improvement on the machine shown in U.S. Patent Number 2,795,087.

In brief, in accordance with my invention, I provide, in combination with an article grinding or cutting mechanism, an article rotating and advancing mechanism which comprises a shaft rotatable about its longitudinal axis, means for rotating the shaft periodically, a cam ring fixedly mounted about the shaft, a cam follower mounted on the shaft to rotate therewith, the cam follower being slidably mounted on the shaft, and means for mounting an article for rotation by the cam follower about the longitudinal axis of the shaft. The cam ring has a cam surface which comprises a pair of smoothly curved sections of progressively increasing height extending from points of minimum height to points of maximum height. The points of maximum height of the sections are at least substantially oppositely disposed on the cam ring, as are the points of minimum height of the sections. The cam follower has at least one finger extending towards and riding on the cam surface. This finger is of sufficient depth to contact the cam surface during a complete rotation of the shaft.

Figure 6:
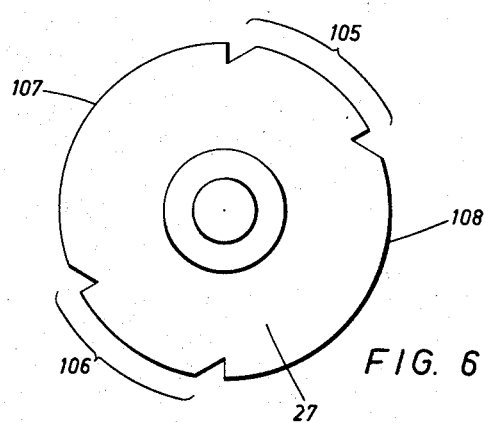
Figure 7:
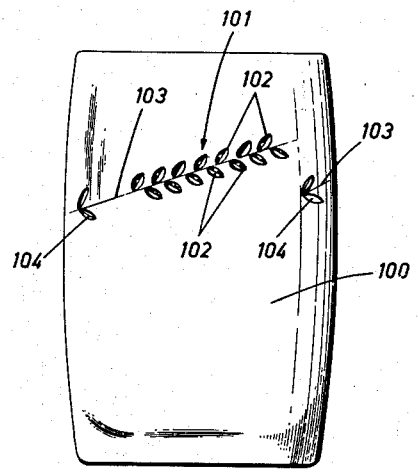

My invention now will be described in more detail with reference to the appended drawings in which:

FIGURE 1 shows, partially in section, part of the machine described in U.S. Patent Number 2,795,087, the machine being modified in accordance with my invention and as required thereby, FIGURE 2 is an end view of part of the apparatus shown in FIGURE 1 showing certain parts of the apparatus in positions different from the positions they occupy in FIGURE 1, FIGURE 3 is a section taken along line 3—3 in FIGURE 1, FIGURES 4 and 5 illustrate cam rings and cam followers embodying my invention, FIGURE 6 is a ratchet wheel or index disc useful in practising my invention, and FIGURE 7 shows one type of glass or tumbler to which ornamentation has been applied by apparatus embodying my invention.

Referring now to FIGURES 1, 2 and 3, the apparatus shown therein is the same as the machine described in U.S. Patent Number 2,795,087 with the exception of the addition of certain components, some of which are best shown in FIGURES 4 and 5. My improvement relates to a specific part of the machine described in the aforementioned patent, and, accordingly, only as much of that machine as is necessary for an understanding of my invention has been illustrated. For a description of the complete machine and its operation reference is made to the aforementioned patent.

Briefly, the prior art machine consists of a glass holding and rotating mechanism shown at 10 in FIGURE 1 and a pair of grinding or cutting units mounted on either side of mechanism 10. Each grinding or cutting unit includes a grinding wheel 11, which is given by a motor, and which is mounted in such a manner that by hydraulic means and spring means it may be moved into and out of engagement with a glass at predetermined times. When the grinding wheels 11 engage the glass, a portion thereof is ground away.

Glass rotating and holding mechanism 10 consists of a frame 12 having a pair of shafts 13 and 14 rotatably mounted therein. Secured to shaft 13 is a gear 15, cams 16 and 17, a gear 18 and cams 19 and 19a. Riding on cam 19 is a follower 20 which activates a hydraulic system (not shown) to control the position of grinding wheels 11. Cam 19a actuates a mechanical and spring linkage (not shown) which also controls the position of grinding wheels 11. Gear 15 is driven by a worm gear 21 connected to a sprocket 22 which is adapted to be rotated by a chain drive from an electric motor, gear reduction unit, clutch and another sprocket, none of the latter components being shown. Freely rotatably mounted on shaft 14 is a gear 23 which meshes with gear 18 and which is connected to and drives one plate of a friction clutch 24, this plate being freely rotatable on shaft 14 also. The other plate of clutch 24 is connected to shaft 14 and rotates therewith. Also connected to shaft 14, and rotatable therewith, is a disc 25 having a notch 26 therein and a ratchet or index wheel 27.

Slidably mounted on frame 12 for up and down movement is a plate 28 which is shown in the down position in FIGURE 1. The position of plate 28 is determined by the engagement of cam 16 with a cam block 29 secured to plate 28. Connected to sliding plate 28 is an arm 30 passing through a slot 30' in frame 12 and connected by a pin 40 to a link 41 which is slidably mounted in frame 12. Link 41 is pin connected at 42 to a lever 43 which is also pin connected at 44 to a fulcrum arm 45 secured to frame 12. Lever 43 is pivotally connected at 46 to a pin 47 which carries a ratchet engaging pawl 48. As best shown in FIGURE 2, pawl 48 is slidably mounted on pin 47, a spring 50a being positioned between the end of pin 47 remote from 46 and pawl 48. The slidable mounting of pawl 48 on pin 47 represents a departure from the structure of the machine described in the aforementioned patent, this change being necessitated for reasons which will become more apparent hereinafter. Pin 47 and pawl 48 are slidable up and down in a cylinder 49 mounted on frame 12, pawl 48 being spring loaded by a spring 50.

As best shown in FIGURES 1 and 3, a lever 51 is pivotally mounted at 52 and is pin connected at 53 to a link member 54 which, in turn, is connected to an arm 55 pivotally mounted at 56 and carrying a pin 57 engaging notch 26.

Supported on a rod 58 extending from frame 12 is an air cylinder 59 supplied through a tube 60. The piston (not shown) in cylinder 59 connects to a rod 61 having a flange 62 rotatably mounted thereon. The position of cylinder 59 on rod 58 may be adjusted. The position of flange 62 relative to cylinder 59 is determined by the air pressure in the cylinder.

If it is considered that the parts designated 70 and 71 in FIGURE 1 are deleted and replaced by a flange secured to the end of shaft 14 and rotatable therewith, and except for the type of ratchet 27 employed and the slidable mounting of pawl 48 on pin 47, the apparatus just described is the same as the apparatus described in U.S. Patent Number 2,795,087.

The improvement which constitutes my invention is best shown in FIGURES 4 and 5 and may also be seen in FIGURE 1. As shown in these figures, I have provided a cam ring 71 which, of course, is circular in cross-section, and which is fixedly mounted about shaft 14. This is conveniently accomplished by securing cam ring 71 to a pipe-like flange 72 formed integral with frame 12 by means of a screw 73. Cam ring 71 has a pair of smoothly curved sections 74 and 75 of progressively increasing height extending from points of minimum height 74a and 75a respectively to points of maximum height 74b and 75b respectively. Points 74a and 75a are spaced 180° apart, as are points 74b and 75b.

Mounted on shaft 14 by a set screw (not shown) and rotatable therewith is a collar 14a having a keyway 77 therein. Mounted on collar 14a and rotatable therewith is cam follower 70 which also is circular in cross-section. Cam follower 70 is slidably mounted on collar 14a by means of a pin 76 having a rod portion 76a which fits into an opening 76b in cam follower 70 from the inside thereof and having a flat head 76c thereon which extends into keyway 77 in collar 14a. By virtue of head 76c engaging keyway 77, cam follower 70 is slidably mounted on collar 14a and shaft 14 and also rotates therewith. A threaded aperture 78 is provided in the top surface 79 of cam follower 70. A rubber disc (not shown) or pad may be secured to top surface 79 to cover the same by means of a screw passed therethrough and threadably engaged in aperture 78.

Cam follower 70 has a surface which is identical to the cam surface of cam ring 71. The surface has two sections 80 and 81 which are smoothly curved and of progresssively increasing height from points 80a and 81a respectively of minimum height, which are 180° apart, to points 80b and 81b respectively of maximum height, which are also 180° apart.

When the foregoing components are assembled in proper relationship to one another, as shown in FIGURE 1, points 74a and 75a, points 74b and 75b, points 80a and 80b and points 81a and 81b lie in four parallel planes perpendicular to the longitudinal axis of shaft 14.

It will be seen from FIGURES 4 and 5 that cam follower 70 has a pair of fingers 82 and 83 which are spaced 180° apart and which extend towards and ride on the cam surface of cam ring 71 during a complete rotation of shaft 14. Fingers 82 and 83 must be of sufficient depth that they remain in engagement with the cam surface of cam ring 71 during a complete rotation of shaft 14. It should be understood, however, that while the surface of cam follower 70 preferably is as shown, nevertheless, it need not be so shaped. It would be sufficient to provide just one finger on cam follower 70, as long as that finger were of sufficient depth to contact the cam surface of cam ring 71 during a complete rotation of shaft 14.

In FIGURE 7 I have shown a glass 100 which has been ornamented on apparatus embodying my invention. The head 101 of the ornamentation consists of fourteen grooves 102, seven on each side of the stem 103, which is hand applied. The ornamentation includes four leaves 104 (only two shown), two on each side of stem 103. This ornamentation is duplicated on the other side of glass 100, and two of the leaves 104 and a part of the stem 103 of the other ornamentation can be seen in the figure. Head 101 is cut by a ratchet of the type shown in FIGURE 2 which consists of two sets 105 and 106 of teeth spaced apart by two circular sectors 107 and 108. Each set of teeth has seven notches, making a total of fourteen notches for fourteen grooves 102. It will be noted that the teeth of each set are immediately adjacent one another, and that corresponding points on the sets of teeth are spaced 180° apart. For larger size glasses I employ a ratchet of the same type as shown in FIGURE 3, but having nine notches in each set of teeth. Such a ratchet produces a head 101 having nine grooves 102 on each side of stem 103.

Ratchet 27 shown in FIGURE 6 has two sets of teeth 105 and 106 spaced apart by two circular sectors 107 and 108. Each set of teeth has only two notches and, in contrast to ratchet 27 shown in FIGURE 3, the teeth of a set are spaced apart from one another. Nevertheless, corresponding points on the sets of teeth are spaced 180° apart. Ratchet 27 shown in FIGURE 6 is employed in the cutting of leaves 104. The spacing between the two teeth of a set results in the spacing apart of the two pairs of leaves 104 of an ornamentation. In contrast, where the teeth of a set are immediately adjacent one another, as shown in FIGURE 2, the grooves 102 making up the head of the ornamentation are spaced close together.

The operation of apparatus embodying my invention is similar to the operation of the machine described in U.S. Patent No. 2,795,087, and reference is made thereto for details of this operation. The difference in operation between this prior art machine and my apparatus is that cam follower 70 and cam ring 71 provide means for advancing glass 100 during the periodic rotation of shaft 14. This is accomplished as follows: When the machine is started, the relative positions of cam follower 70 and cam ring 71 are such that points 81b and 80b on cam follower 70 are in contact with points 75a and 74a respectively on cam ring 71. Thus, the cam ring and cam follower are as close together as possible. The lip of glass 100 is mounted against the rubber pad on top surface 79 of cam follower 70, with the base of glass 100 being abutted against rotatable flange 62 which also is rubber covered. From this position of flange 62 it can be moved back towards cylinder 59 against the air pressure therein by a distance at least as great as the depth of a finger 82 or 83. Pawl 48 is urged against point A on sector 107 by spring 50, sliding plate 28 is in a fully up position, and cam 16 is not at its high position. Spring 50a is compressed. Pin 57 is engaged in notch 26, and the parts shown in FIGURE 3 are in the position indicated in that figure. Grinding wheels 11 are spaced apart from and do not engage glass 100, but are being rotated by their drive mechanisms. The motor which is adapted to drive sprocket 22 by means of a chain is turned on, but no rotation of sprocket 22 results, because arm 55 locks cam 17. Instead, the clutch (not shown) to which the motor is connected slips. To start the apparatus, lever 51 is moved sideways disengaging pin 57 from notch 26 and releasing cam 17. The clutch connected to the main drive motor then engages, and sprocket 22 is turned. This in turn results in the rotation of gears 15 and 18 and cams 16, 17, 19 and 19a. Gear 18 drives one plate of clutch 24, and since the other plate of clutch 24 is no longer locked, by reason of the removal of pin 57 from notch 26, the clutch plates of clutch 24 engage, and ratchet 27 is rotated in the direction shown in FIGURE 3. Since cam 16 still is not at its high position, plate 28 remains in the up position under the influence of spring 50 and through the linkage consisting of pawl 48, pin 47, lever 43, link 41 and arm 30, and pawl 48 is forced downwardly into the first notch in the set of teeth 106. When pawl 48 is forced into the first notch, clutch 24 slips, and there is no further rotation of shaft 14. After shaft 14 has been thus locked, continued rotation of shaft 13 and cams 19 and 19a results in the movement of grinding wheels 11 into engagement with glass 100. The manner in which this is accomplished is set out in detail in the aforementioned patent and forms no part of the present invention. Shaft 13 is continuously rotating during this grinding operation as is gear 23, and arm 55 does not engage the stop on cam 17 and cause rotation of shaft 13 to cease, as pin 57 is resting on the circular edge of disc 25, and this holds the end of arm 55 away from cam 17. Further rotation of shaft 13 and cams 19 and 19a results in the withdrawal of grinding wheels 11 from glass 100, all as set out more particularly in the aforementioned patent. During grinding, each wheel 11 grinds one groove 102 on an opposite side of the glass. After further rotation of shaft 13, cam 16 reaches its high point and forces sliding plate 28 downwardly to the position shown in FIGURE 1. This lifts pawl 48 from the first notch in set of teeth 106, and shaft 14 is again free to move. Cam 16 permits ratchet 27 to move one notch before the cam rotates to its low point, causing sliding plate 28 to move upwardly again, and dropping pawl 48 into the next notch in set of teeth 106, thereby again causing slippage of clutch 24 and stopping rotation of shaft 14. Every time that shaft 14 rotates, cam follower 70 also rotates. Since fingers 82 and 83 of cam follower 70 are riding on sections 75 and 74 respectively of cam ring 71, every time shaft 14 makes a part of a complete rotation, cam follower 70 is moved a little further from frame 12. Any point on the glass travels in a spiral path. Thus it will be seen that glass 100 is steadily moved further away from frame 12, while rod 61 is pushed back into cylinder 59. In this manner each groove 102 is cut a little closer to the lip of glass 100. After pawl 48 has engaged each of the seven notches in set of teeth 106, the ornamentations on each side of the glass will each have seven grooves therein, all on one side of stems 103. When pawl 48 is lifted in the aforementioned manner from the last notch in set of teeth 106, ratchet 27 will rotate in the aforementioned manner until pawl 48 is at point B (FIGURE 3) which is 180° from point A. The necessity for spring 50a now can be seen. During movement of ratchet 27 from the last notch in set of teeth 106 to point B, the low surface of cam 16 will be engaging cam block 29, and hence pawl 48 will be urged against section 108 of ratchet 27. Binding is avoided by taking up the downward movement of pawl 48 in compression of spring 50a. Just before ratchet 27 rotates to the point where pawl 48 engages point B, cam follower 70 and cam ring 71 are in the position shown in FIGURE 1. In this position cam follower 70 is furthest from frame 12 and flange 62 is closest to cylinder 59. When point B is reached, cam follower 70 and cam ring 71 assume the same position as they were in at point A, glass 100 has rotated through 180°, as has disc 25, and rod 61 and flange 62 are forced outwardly by the air pressure in cylinder 59 to the position they occupied when pawl 48 was engaging point A. When ratchet 27 has rotated so that pawl 48 is at point B, cam 16 is in the same position as when pawl 48 was at point A, the position of cam 16 at these points being such that the cam has rotated so that its high point is slightly beyond the point where it engages cam block 29. Moreover, as ratchet 27 rotates from the end of set of teeth 106 to point B, or from the end of set of teeth 105 to point A, during which time cam 16 makes substantially less than a complete revolution, the rotation of shaft 13 is limited to the extent that cams 19 and 19a do not cause activation of the grinding wheels 11 towards glass 100 until pawl 48 is engaged in the first notch of set of teeth 105 or 106 respectively and shaft 14 is locked. The aforementioned results are accomplished by making gear 23 smaller than gear 18 so that shaft 14 rotates faster than shaft 13. The aforementioned operations are repeated for each of the notches in set of teeth 105. During this time grooves 102 on the other side of stems 103 are cut. When ratchet 27 rotates so that pawl 48 is again at point A, disc 25 will have rotated through 360°, and pin 57 will fall into notch 26. At this time the end of arm 55 engages the locking abutment on cam 17 and rotation of shafts 13 and 14 ceases. The clutch connected to the main drive then slips. Glass 100 then is removed by pulling back on rod 61 and is replaced by an uncut glass.

After glass 100 has been processed as aforementioned, and heads 101 cut thereon, the glass is placed in another machine of the type which has been described and which employs a ratchet wheel of the type shown in FIGURE 6. This machine cuts four leaves 104 for each ornamentation in the same manner as has been just described. This machine employs a cam 16 having a longer high point than cam 16 for the head cutting machine to compensate for the larger spacing between the two teeth of a set of teeth on the ratchet.

It will be noted that in the aforementioned patent the longitudinal axis passing through the shaft corresponding to shaft 14 in FIGURE 1, and the longitudinal axes of the shafts which are connected to and rotate the grinding wheels, all lie in a horizontal plane or are parallel to one another. In order to cut grooves 102 which are angularly disposed on the surface of glass 100, I incline the longitudinal axis of shaft 14 with respect to the axes of the shafts rotating grinding wheels 11. This may be done by maintaining shaft 14 horizontal and inclining the shafts connected to grinding wheels 11 with respect to the horizontal or, alternatively, these last mentioned shafts may be horizontal and unit 10 may be inclined so that shaft 14 is inclined with respect to these shafts. It will be noted that grinding wheels 11 are symmetrically mounted on either side of a vertical plane passing through the longitudinal axis of shaft 14.

As aforementioned, for further details of a complete grinding or cutting machine, and the operation thereof, attention is directed to the patent referred to previously. It should be noted, however, that my invention may be utilized with machines of a different type than that shown in this patent, and reference is made thereto only by way of example and not by way of limitation.

In particular, my invention may be utilized with machines sold under the trademark "Laurel Wreath" by Victor Walker—Glassware Laboratory, Suncrest, Morgantown, West Virginia, U.S.A.

While I have described a preferred embodiment of my invention, those skilled in the art will appreciate that changes and modifications may be made thereto without departing from my invention as defined in the appended claims.

What I claim as my invention is:

1. In combination with an article grinding or cutting mechanism, an article rotating and advancing mechanism comprising a shaft rotatable about its longitudinal axis, rotating means for rotating said shaft periodically, said rotating means for rotating said shaft periodically including a ratchet mounted on said shaft for rotation therewith, said ratchet having a pair of sets of teeth, said sets of teeth being identical with one another and separated by portions of said ratchet having no teeth, corresponding points on said sets of teeth being spaced at least substantially 180° apart and ratchet teeth engaging means adapted to alternately engage and disengage said teeth, where rotation of said shaft is alternately stopped and started during a complete rotation of said shaft at predetermined times and for predetermined intervals, a cam ring fixedly mounted about said shaft, a cam follower mounted on said shaft to rotate therewith, said cam follower being slidably mounted on said shaft, and means for mounting an article for rotation by said cam follower about the longitudinal axis of said shaft, said cam ring having a cam surface comprising a pair of smoothly curved sections of progressively increasing height extending from a point of minimum height to a point of maximum height, the points of maximum height of said sections being at least substantially oppositely disposed on said cam ring, the points of minimum height of said sections being at least substantially oppositely disposed on said cam ring, said cam follower having at least one finger extending towards and riding on said cam surface and of sufficient depth to contact said cam surface during a complete rotation of said shaft.

2. In combination with an article grinding or cutting mechanism, an article rotating and advancing mechanism according to claim 1 wherein each of said sections covers at least substantially 180° of said cam ring.

3. In combination with an article grinding or cutting mechanism, an article rotating and advancing mechanism according to claim 2 wherein said cam follower has a pair of fingers extending towards and riding on said cam surface and each of sufficient depth to contact said cam surface during a complete rotation of said shaft, said fingers being positioned on opposite sides of said shaft and spaced at least substantially 180° apart.

4. In combination with an article grinding or cutting mechanism, an article rotating and advancing mechanism comprising a shaft rotatable about its longitudinal axis, rotating means for rotating said shaft periodically, said rotating means for rotating said shaft periodically including a ratchet mounted on said shaft for rotation therewith, said ratchet having a pair of sets of teeth, said sets of teeth being identical with one another and separated by portions of said ratchet having no teeth, corresponding points on said sets of teeth being spaced at least substantially 180° apart, ratchet teeth engaging means adapted to engage said teeth and means for alternately actuating said ratchet teeth engaging means from a tooth engaging position to a tooth disengaging position during a complete rotation of said shaft, whereby rotation of said shaft is alternately stopped and started at predetermined times and for predetermined intervals during a complete rotation of said shaft, a cam ring fixedly mounted about said shaft, a cam follower mounted on said shaft to rotate therewith, said cam follower being slidably mounted on said shaft, and means for mounting an article for rotation by said cam follower about the longitudinal axis of said shaft, said cam ring having a cam surface comprising a pair of smoothly curved sections of progressively increasing height extending from a point of minimum height to a point of maximum height, the points of minimum height of said sections being at least substantially oppositely disposed on said cam ring, each of said sections covering at least substantially 180° of said cam ring, said cam follower being circular in cross-section perpendicular to said shaft, said cam follower having a cam following surface comprising a pair of smoothly curved sections of progressively increasing height extending from a point of minimum height to a point of maximum height, the points of maximum height of said sections of said cam follower being at least substantially oppositely disposed on said cam follower, the points of minimum height of said sections of said cam follower being at least substantially oppositely disposed on said cam follower, each of said sections of said cam follower covering at least substantially 180° of said cam follower, said cam surfaces being disposed adjacent one another, said points of maximum height of said sections of said cam follower riding on said cam surface of said cam ring and being of sufficient depth to contact said cam surface of said cam ring during a complete rotation of said shaft.

5. The invention according to claim 1 wherein the individual teeth of a set of teeth are spaced apart from one another by portions of said ratchet having no teeth.

6. The invention according to claim 1 wherein the teeth of each set of teeth are immediately adjacent one another.

7. The invention according to claim 5 wherein each set of teeth has two teeth.

8. The invention according to claim 6 wherein each set of teeth has more than two teeth.

9. The invention according to claim 8 wherein each set of teeth has seven teeth.

10. The invention according to claim 8 wherein each set of teeth has nine teeth.

11. The invention according to claim 1 wherein said article grinding or cutting mechanism is a glass cutting or grinding mechanism, said article rotating and advancing mechanism is a glass rotating and advancing mechanism and said means for mounting an article for rotation is means for mounting a glass for rotation.

12. The invention according to claim 4 wherein the individual teeth of a set of teeth are spaced apart from one another by portions of said ratchet having no teeth.

13. The invention according to claim 4 wherein the teeth of each set of teeth are immediately adjacent one another.

14. The invention according to claim 12 wherein each set of teeth has two teeth.

15. The invention according to claim 13 wherein each set of teeth has more than two teeth.

16. The invention according to claim 15 wherein each set of teeth has seven teeth.

17. The invention according to claim 15 wherein each set of teeth has nine teeth.

References Cited in the file of this patent

UNITED STATES PATENTS

| | | |
|---|---|---|
| 2,097,135 | Schutz | Oct. 26, 1937 |
| 2,236,327 | Bates | Mar. 25, 1941 |